United States Patent [19]

Hara

[11] Patent Number: 5,703,958
[45] Date of Patent: Dec. 30, 1997

[54] PICTURE PROCESSING METHOD FOR CORRECTING DISTORTED PICTURES AND APPARATUS FOR EXECUTING THIS METHOD

[75] Inventor: Masanori Hara, Tokyo, Japan

[73] Assignee: NEC Corporation, Tokyo, Japan

[21] Appl. No.: 297,042

[22] Filed: Aug. 29, 1994

[30] Foreign Application Priority Data

Aug. 27, 1993 [JP] Japan .................... 5-212019

[51] Int. Cl.$^6$ ............................. G06K 9/03
[52] U.S. Cl. ........................ 382/124; 382/275
[58] Field of Search ..................... 382/275, 107, 382/293, 124–127, 300, 299, 298, 295, 294; 395/150, 151

[56] References Cited

U.S. PATENT DOCUMENTS

| | | | |
|---|---|---|---|
| 3,905,045 | 9/1975 | Nickel | 382/130 |
| 4,310,827 | 1/1982 | Asai | 382/125 |
| 4,558,462 | 12/1985 | Horiba et al. | 382/275 |
| 4,791,581 | 12/1988 | Ohba | 395/125 |
| 4,870,692 | 9/1989 | Zuiderveld et al. | 382/107 |
| 5,105,467 | 4/1992 | Kim et al. | 382/125 |
| 5,140,642 | 8/1992 | Hsu et al. | 382/124 |
| 5,155,805 | 10/1992 | Kaasila | 395/150 |

Primary Examiner—Edward L. Coles, Sr.
Assistant Examiner—Larry J. Prikockis
Attorney, Agent, or Firm—Foley & Lardner

[57] ABSTRACT

A picture processing method for correcting distorted pictures is provided. A plurality of starting points are displayed on the boundary of the picture to be corrected. An operator enters motion vectors, each corresponding to a starting point. The motion vector for any starting point for which no motion vector was entered is calculated. The picture is converted according to the motion vectors. This conversion corresponds to procedures to move points in the picture in the directions indicated by motion vectors. The closer a given motion vector is to a point, the more it affects the direction and distance of the motion of this point. A converted picture is displayed. As required, processing steps are executed again, and motion vectors are designated again. The desired picture is obtained by repeating the setting of motion vectors and the evaluation of the converted picture.

8 Claims, 12 Drawing Sheets

PICTURE PROCESSING METHOD FOR CORRECTING DISTORTED PICTURES AND APPARATUS FOR EXECUTING THIS METHOD

BACKGROUND OF THE INVENTION

The present invention relates to a picture processing method for correcting distorted pictures, and more particularly to a picture processing method for correcting the pictures of distorted fingerprints prior to fingerprint matching.

A situation in which a distorted picture needs to be corrected arises when, for instance, a fingerprint is subjected to automatic matching. One example of a conventional automatic fingerprint matching apparatus is disclosed in U.S. Pat. No. 4,310,827. This apparatus encodes a streaked pattern 31, such as a fingerprint or the like, with a unit 41. The encoded picture data are processed, without being corrected, for automatic matching.

In the automatic matching of a fingerprint by such an apparatus, pattern features of the fingerprinting (hereinafter referred to as minutiae) are extracted from a latent fingerprint. Minutiae include an end point where a ridge line ends and a bifurcation point where a ridge line bifurcates. A fingerprint is recognized by matching extracted minutiae with those of fingerprints accumulated in a database. Therefore, the picture quality of the latent fingerprints determines the success or failure of recognition.

However, latent fingerprints are usually poor in picture quality. Especially when a fingerprint is left on the curved face of a glass or the like, its pattern is caused to be distorted. Distortion of the pattern makes it difficult to determine the positions of feature points. Accordingly, there is the problem that only a low probability of successful recognition can be expected from an uncorrected distorted latent fingerprint.

SUMMARY OF THE INVENTION

A first object of the present invention, therefore, is to provide a picture processing method for correcting distorted pictures. More specifically, this first object of the invention is to provide a picture processing method to convert the input picture in accordance with motion vectors designated by the operator.

A second object of the invention is to provide a picture processing method for producing smooth and natural converted pictures.

A third object of the invention is to provide a picture processing method capable of producing smooth and natural converted pictures without needing a large number of motion vectors to be designated. An apparatus according to this aspect of the invention, if motion vectors are designated for only some starting points, estimates motion vectors for undesignated starting points according to the designated motion vectors.

A fourth object of the invention is to provide a picture processing method capable of adjusting motion vectors according to a converted picture. An apparatus according to this aspect of the invention can bring a converted picture close to the desired one by adjusting motion vectors over again.

A fifth object of the invention is to provide a picture processing method capable of executing the conversion of a picture based on motion vectors at high speed.

A sixth object of the invention is to provide a picture processing method for converting the picture of a fingerprint remain into a picture readily permitting automatic collation.

This object is achieved by providing in a picture processing method for converting a first set of picture data representing an uncorrected picture into a second set of picture data representing a corrected picture, a step to enter motion vectors indicating the directions of deformation of the uncorrected picture; another step to determine a pixel in the second set of picture data corresponding to a pixel in the first set of picture data on the basis of these motion vectors; and still another step to save each pixel datum of the second set of data, and determining the data of each pixel of the second set of picture data on the basis of data held by the corresponding pixel of said first set of picture data.

If this method is applied to an automatic fingerprint matching apparatus, the uncorrected picture is the picture of a fingerprint remain.

Motion vectors are designated by setting a plurality of starting points in an uncorrected picture and entering a motion vector corresponding to each of these starting points. If said plurality of starting points include any unidentified starting point for which no motion vector has been entered, the motion vector for the unidentified starting point is calculated on the basis of the entered motion vectors. The motion vector for the unidentified starting point is obtained from the weighted average of the entered motion vectors. The weight of each motion vector to be subjected to weighted averaging is determined on the basis of the distance from the starting point of this motion vector and that of the unidentified starting point. The distance between the starting point of the motion vector and that of the unidentified starting point being represented by r, the smaller the value of r, the greater the weight of the motion vector. In further detail, the weight of a motion vector is $1/r^2$. The starting point can be positioned on the contour of the uncorrected picture, and the contour is designated by the operator. At this time, motion vectors positioned on the two sides of the unidentified starting point are subjected to weighted averaging.

Further, the vector between a pixel in the second set of picture data and the corresponding pixel in the first set of picture data is obtained from the weighted average of the motion vectors. The weight of each motion vector is determined according to the distance r between the end point of the motion vector and the pixel in the second set of picture data. The smaller the value of r, the greater the weight of the motion vector. In further detail, the weight of a motion vector is $1/r^2$.

After the picture is converted, a corrected picture is displayed. Depending on the result, motion vectors are set again.

BRIEF DESCRIPTION OF THE DRAWINGS

Other objects, features and advantages of the present invention will become more apparent when the following detailed description is read in conjunction with the accompanying drawings, wherein.

In these figures, the same reference numerals denote the same parts respectively.

DETAILED DESCRIPTION OF THE PREFERRED EMBODIMENT

Next will be described in detail the present invention with reference to drawings. First will be described an actual example of a distorted picture.

Figure 1A:
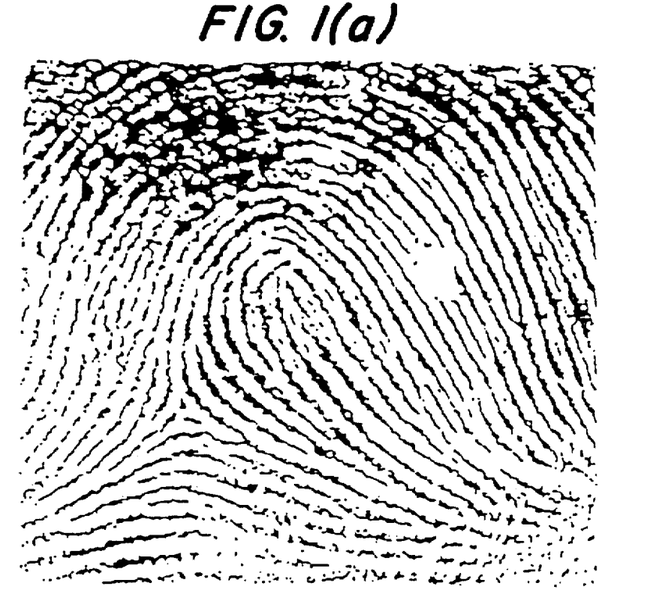
FIGS. 1(a) and 1(b) illustrates an undistorted fingerprint picture and a distorted fingerprint picture.
Figure 1B:
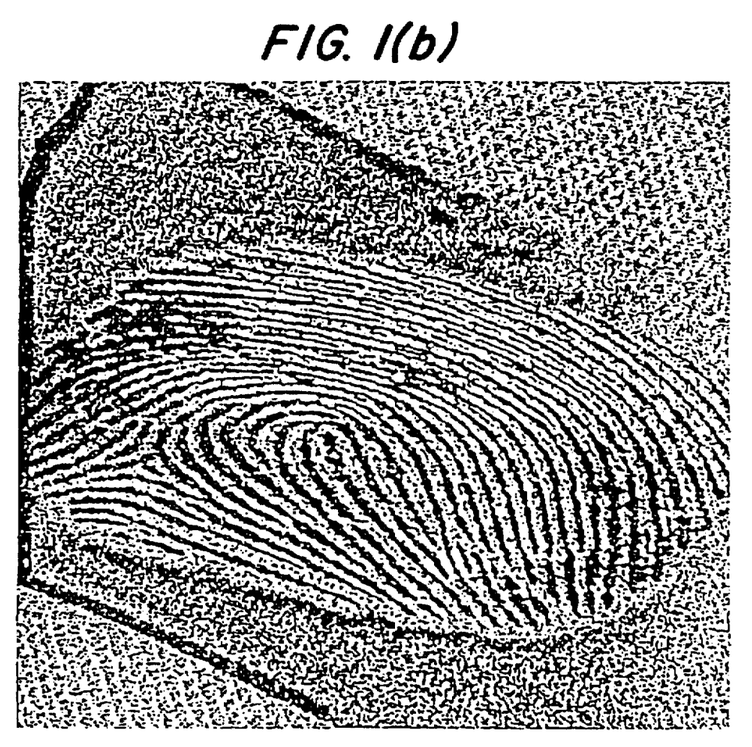

FIG. 1(a) illustrates an undistorted picture of a fingerprint, while FIG. 1(b) shows a distorted picture of a fingerprint, which is compressed in the vertical direction. Such a distortion occurs when a fingerprint is left on a curved face, such as the surface of a glass. An object of the invention is to correct the picture of FIG. 1(b) into the state of FIG. 1(a).

Figure 2:
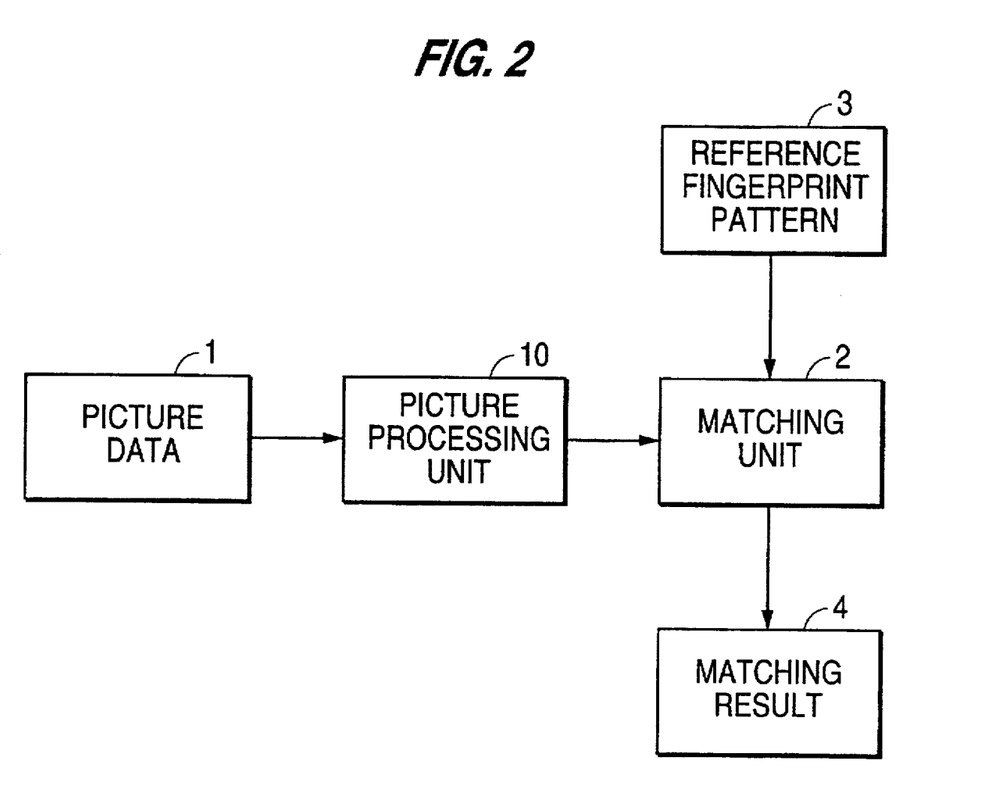
FIG. 2 is a block diagram of a fingerprint collation system to which a picture processing unit 10, which is a preferred embodiment of the invention, is applied.

Referring to FIG. 2, picture data 1, which represent a distorted fingerprint picture, are entered into a picture processing unit 10. The picture processing unit 10 corrects the distortion of the picture data 1. The picture processing unit 10 uses the picture processing method according to the invention. The picture data, whose distortion has been corrected by the picture processing unit 10, are sent out to a matching unit 2. The matching unit 2 matches the picture data sent from the picture processing unit 10 with a reference fingerprint pattern 3 stored in a data base. For the picture matching, what is disclosed in the aforementioned Patent can be used, for instance.

Figure 3:
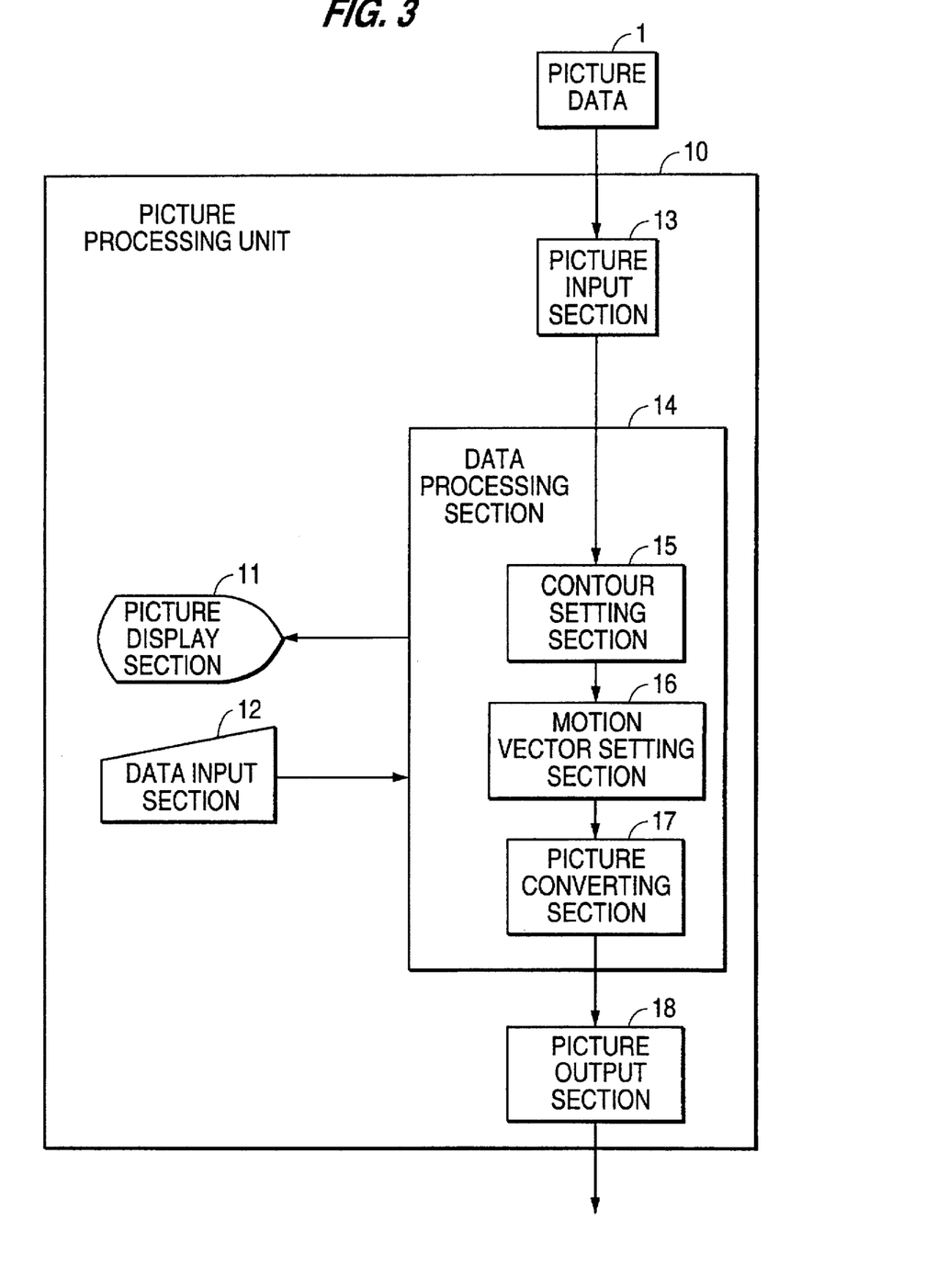
FIG. 3 is a block diagram of the picture processing unit 10 of the preferred embodiment of the invention.

Referring to FIG. 3, the picture processing unit 10 includes a picture display section 11 and a data input section 12. On the picture display section 11 are displayed a picture to be corrected and the corrected picture. The operator, while looking at the picture displayed on the picture display section 11, enters various data for picture correction into the picture processing unit 10. These data are transmitted to the picture processing unit 10 via the data input section 12. Most of the data to be entered are coordinate information. Therefore, the data input section 12 should preferably have such pointing device as a mouse or a tablet. The input data are graphically displayed on the picture display unit. This display enables the operator to confirm the propriety of the input data. The picture display section 11 and the data input section 12 can be shared with the aforementioned matching unit 2.

The picture processing unit 10 includes a picture input section 13. The picture input section 13 receives picture data 1 from outside. The picture data 1 are converted in advance by a picture reading apparatus, such as an image scanner, into a computer-processible form. More specifically, the picture data 1 are divided into a plurality of pixels, for each of which a datum indicating the relative darkness is set. The picture input section 13 supplies the received picture data to a data processing section 14.

The data processing section 14 corrects any distortion of the picture data 1. The data processing section 14 includes a contour setting section 15, a motion vector setting section 16, and a picture converting section 17.

The contour setting section 15 determines the contour of an area in the picture data 1. Only the distortion in the area surrounded by this contour is corrected. The contour is designated by the operator via the data input section 12. To enable the operator to designate the contour, the picture input section 13 displays the picture data 1 on the picture display section 11. After the contour is designated, the data within the contour are cut out of the picture data 1.

The motion vector setting section 16 determines motion vectors indicating the directions of the deformation of the picture data 1. The motion vectors are designated by the operator via the data input section 12. To enable the operator to designate the motion vectors, the data processing section 14 displays the picture data 1 and a plurality of starting points on the picture display section 11. The plurality of starting points are where the motion vectors start, and are positioned on the contour determined by the contour setting section 15. With respect to some of the plurality of starting points, the operator enters motion vectors at these points. For any starting point with respect to which no motion vector was entered, the motion vector at this starting point is automatically calculated. This calculation is executed on the basis of the designated motion vectors. The calculated motion vector is displayed on the picture display section 11. If the calculated motion vector is found unsatisfactory, motion vectors can be entered again.

The picture converting section 17 converts the picture data 1 according to the motion vectors set by the motion vector setting section 16. This conversion roughly corresponds to the elongation and compression of the picture data 1 in the directions of the motion vectors. The converted picture is displayed on the picture display section 11. If the converted picture is found unsatisfactory, motion vectors can be set again. If a satisfactory picture is obtained, the data of this picture are supplied to the picture output section 18.

The picture output section 18 supplies the converted picture data to an external apparatus, which, in this embodiment of the invention, is the matching unit 2.

The picture processing unit 10 may as well be a part of the matching unit 2. For instance, the picture processing unit 10 may be realized by software to be executed with the matching unit 2.

Next will be described the operation of this embodiment with reference to drawings.

Figure 4:
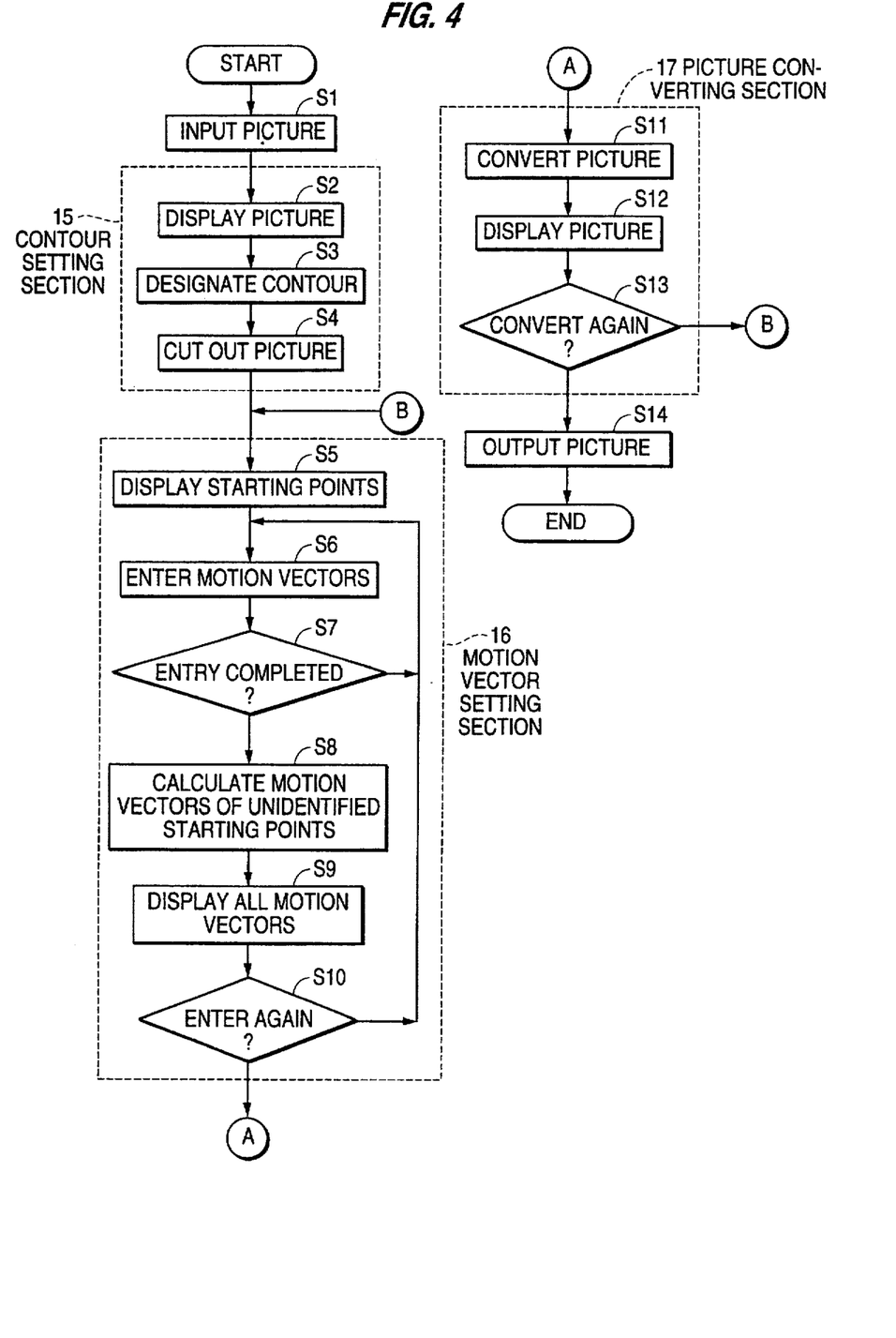
FIG. 4 is a flow chart showing the operation of the picture processing unit 10.

Referring to FIG. 4, the operation of the picture processing unit 10 consists of steps 1 to 14. Step 1 is executed by the picture input section 13. Steps 2 to 4 are executed by the contour setting section 15; steps 5 to 10, by the motion vector setting section 16; and steps 11 to 13, by the picture converting section 17. Step 14 is executed by the picture output section 18.

At step 1, the picture input section 13 receives the picture data 1.

At step 2, the contour setting section 15 displays the picture data 1 on the picture display section 11.

Figure 5A:
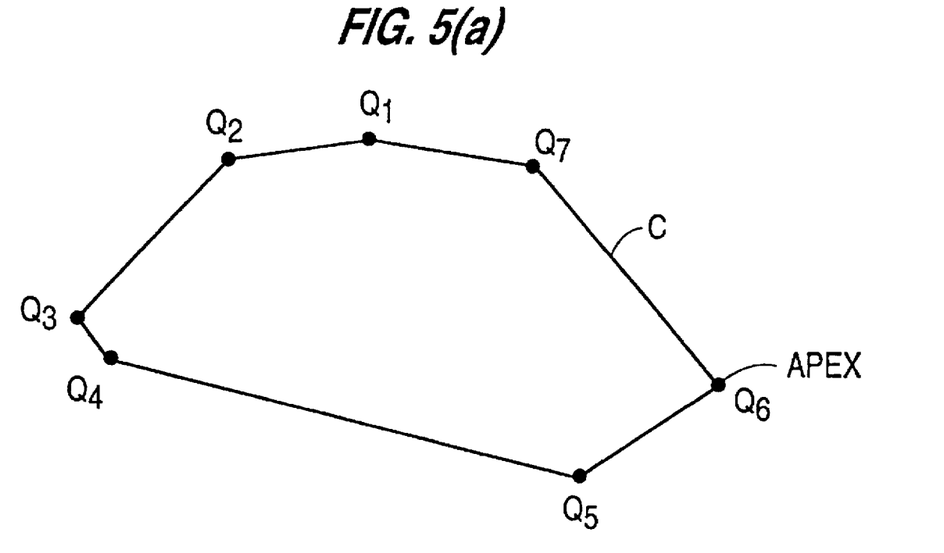
FIGS. 5(a) and 5(b) illustrate a contour and a cutout according to the contour of the picture data illustrated in FIG. 1(b)
Figure 5B:
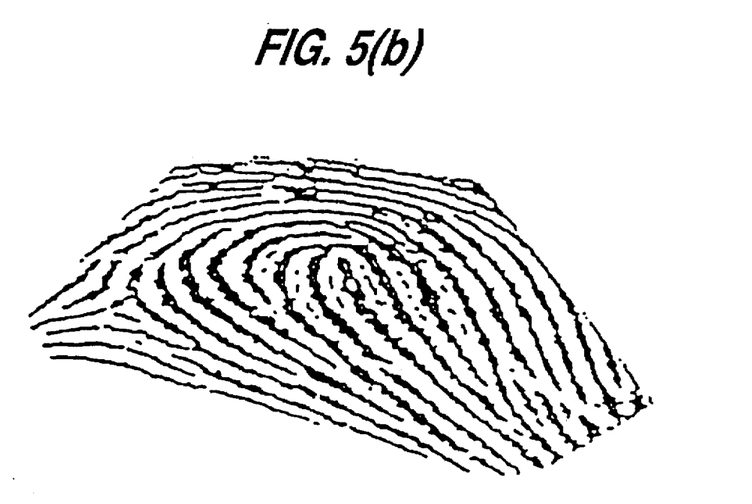

Referring to FIGS. 4 and 5 together, at step 3, the contour C of an area in the picture data 1 is designated. Any distortion within this contour C is corrected. The contour C is designated by the operator via the data input section 12.

More specifically, as illustrated in FIG. 5 (a), apexes Q of the contour C are designated. In the case of FIG. 5(a), seven apexes $Q_1$ to $Q_7$ are designated. Since the picture data 1, the designated apexes $Q_n$ and the lines linking the apexes Qn overlap one another on the actual display screen, it is easy to designate the apexes $Q_n$. Although the contour C is a polygon in this embodiment, a closed curved line can be designated as the contour C.

At step 4, the contour setting section 15 cuts out the picture data 1 within the contour C, entered at step 1. If the contour C illustrated in FIG. 5(a) is designated for the picture data shown in FIG. 1(b), the picture data illustrated in FIG. 5(b) will be cut out.

Figure 6A:
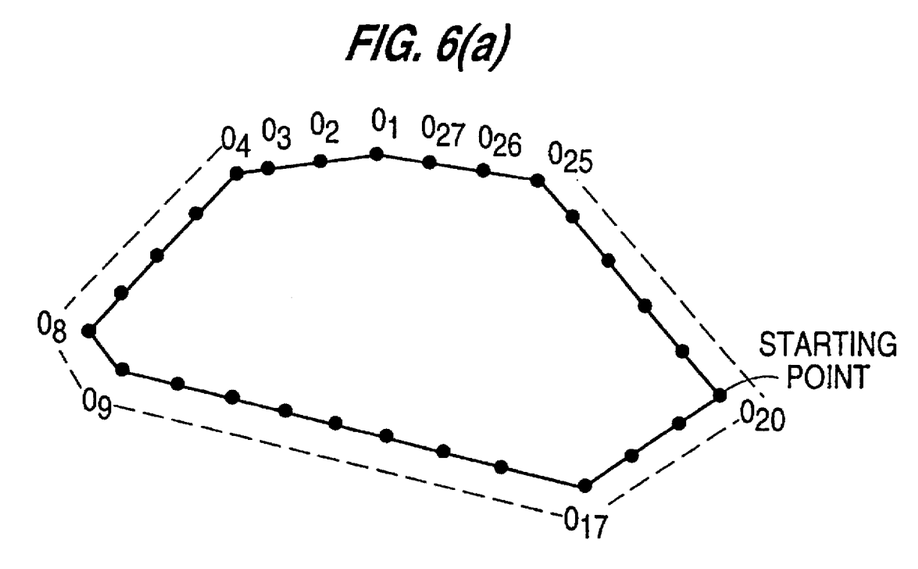
FIGS. 6(a) and 6(b) are a diagrams, for describing the operation of a contour setting section 15.
Figure 6B:
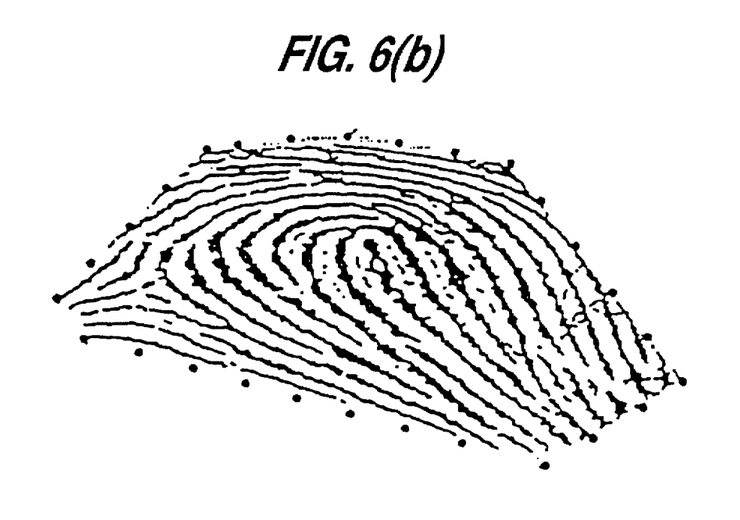

Referring now to FIGS. 4 and 6, at step 5, the motion vector setting section 16 displays starting points $O_n$ on the picture display section 11. In the case of FIG. 6(a), 27 starting points $O_1$ to $O_{27}$ are displayed. The starting points $O_n$ are where motion vectors, to be described below, are to start. The starting points $O_n$ are arranged on the contour at equal intervals. An adequate interval is set in advance. If the intervals between the starting points $O_n$ are too long, the converted picture will not be smooth, or if the intervals are too short, the converted picture will be smooth, but the processing will take a long time. The picture data and the starting points overlap one another on the actual display screen as illustrated in FIG. 6(b).

The starting points $O_n$ can as well be arranged elsewhere than on the contour. However, arranging the starting points $O_n$ on the contour will make the converted picture smoother. For automatic fingerprint matching, a smoother converted picture is more desirable. This advantage of arranging the starting points $O_n$ on the contour was discovered after trial and error.

Figure 7A:
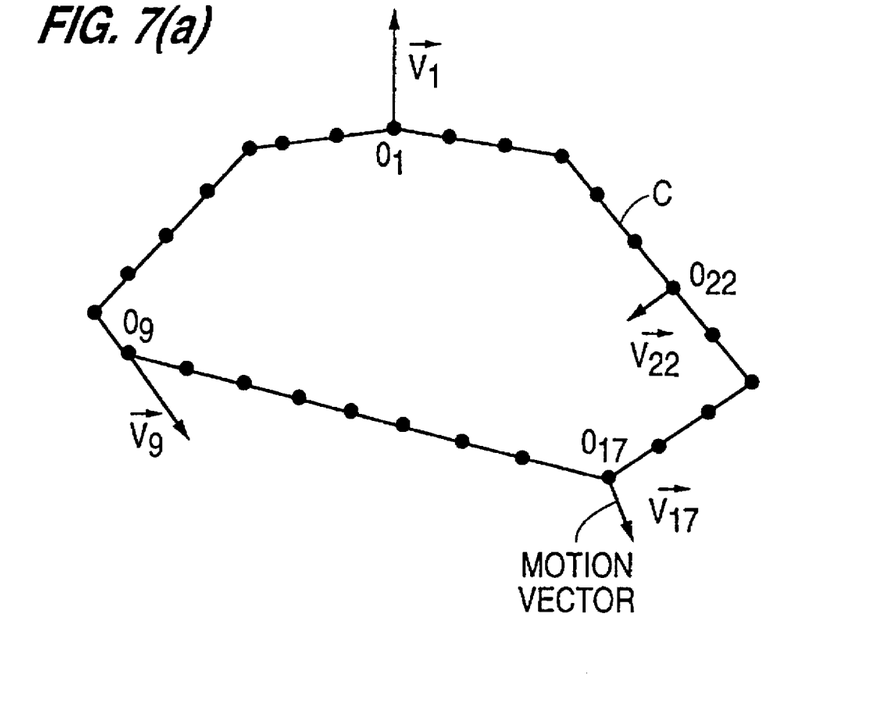
FIGS. 7(a) and 7(b) are diagram for describing the operation of a motion vector setting section 16.
Figure 7B:
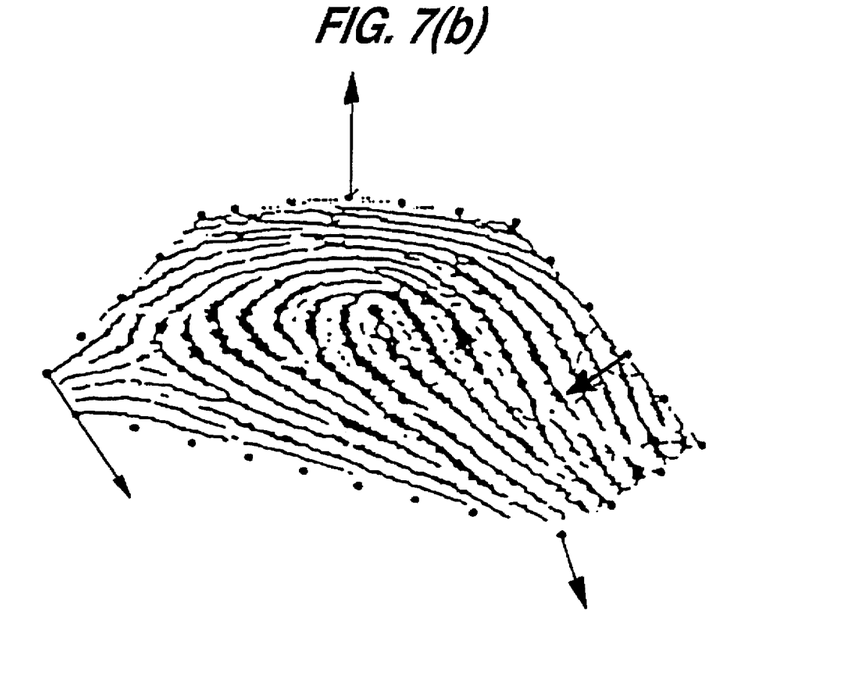

Referring to FIGS. 4 and 7, at step 6, motion vectors V are designated by the operator via the data input section 12. The operator selects some of the starting points $O_n$ displayed at step 5. Each starting point $O_n$ is selected by positioning the cursor on the starting $O_n$ to be selected and pressing a prescribed button. For only the starting points selected in this manner, the operator designates motion vectors. Each motion vector is designated by moving the cursor to the intended end point, and pressing a prescribed button. The vector linking each selected starting point and the corresponding end point is the motion vector. In FIG. 7 (a), four starting points $O_1$, $O_9$, $O_{17}$ and $O_{22}$ are selected, and motion vectors $V_1$, $V_9$, $V_{17}$ and $V_{22}$ respectively corresponding to these starting points are designated. No motion vector corresponding to any other starting point is designated. On an actual display screen, as illustrated in FIG. 5(b), the picture data 1, the starting points and the entered motion vectors overlap one another.

There are the following relationships of correspondence between the motion vectors and picture conversions by the picture converting section 17. A conversion executed by the picture converting section 17 causes points of the picture data 1 to move. A motion vector designates the direction and distance of motion of a nearby point. When a motion vector is toward the outside of the picture data 1, the picture data 1 are extended. When a motion vector is toward the inside, the picture data 1 are compressed. The optimal motion vectors for correcting the distortion of the picture data 1 cannot be known in advance. The operator brings each motion vector close to the optimum by repeating its designation and the confirmation of the converted picture.

Referring now to FIG. 4, at step 7, the motion vector setting section 16 judges whether or not the entry of motion vectors has been completed. When the operator indicates the completion of entry via the data input section 12, the motion vector setting section 16 executes step 8. If entry has not yet been completed, the motion vector setting section 16 will execute step 6 again.

Figure 8:
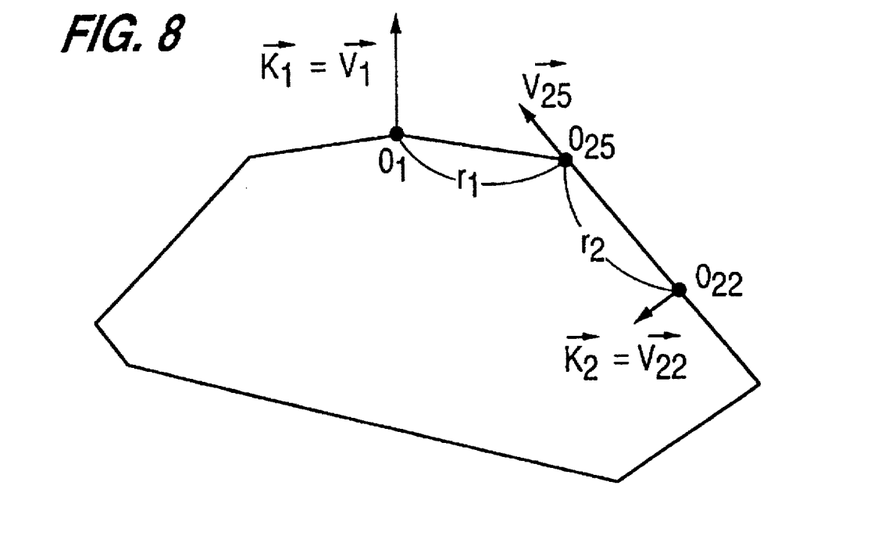
FIG. 8 is another diagram for describing the operation of the motion vector setting section 16.

Referring to FIGS. 4 and 8 together, at step 8, the motion vector for any starting point for which no motion vector was designated is calculated. Starting points for which no motion vector was designated are called unidentified starting points. In FIG. 7(a), all starting points other than $O_1$, $O_9$, $O_{17}$ and $O_{22}$ are unidentified starting points.

The motion vector for any unidentified starting point is calculated in accordance with the following Equation (1).

$$\vec{V_n} = \frac{\left(\dfrac{\vec{K_1}}{r_1^2}\right) + \left(\dfrac{\vec{K_2}}{r_2^2}\right)}{\left(\dfrac{1}{r_1^2}\right) + \left(\dfrac{1}{r_2^2}\right)} \tag{1}$$

where $V_n$ is the motion vector to be calculated; $K_1$ and $K_2$ are motion vectors positioned on two sides of the starting point of $V_n$ among the motion vectors entered at step 6; and $r_1$ and $r_2$ are the distances between the starting point of $V_n$ on the one hand and the starting points of $K_1$ and $K_2$, respectively, on the other, provided that $V_n = K_1$ if $r_1 = 0$ or $V_n = K_2$ if $r_2 = 0$. Referring to FIG. 8, when the motion vector $V_{25}$ for the starting point $O_{25}$ is to be calculated, $V_1$ and $V_{22}$ are $K_1$ and $K_2$, respectively. Equation (1) represents an arithmetic operation usually referred to as weighted averaging. The following Equation (2) is a general formula of weighted averaging.

$$m = \frac{\sum\limits_n w_n \cdot a_n}{\sum\limits_n w_n} \tag{2}$$

In Equation (2), $a_n$ is the n-th element; $w_n$, the weight of the element $a_n$; and m, the weighted average of $a_n$. In Equation (1), $a_n$ is $K_1$ or $K_2$, and $w_n$ is the reciprocal of the square of $r_n$.

A motion vector obtained by Equation (1) has the following characteristics. When an unidentified starting point is close to $K_1$, the motion vector $V_n$ of this starting point is substantially equal to $K_1$. When an unidentified starting point is close to $K_2$, the motion vector $V_n$ of this starting point is substantially equal to $K_2$. When an unidentified starting point is at substantially equal distances to $K_1$ and $K_2$, the motion vector $V_n$ of this starting point is substantially equal to the average of $K_1$ and $K_2$. Because of these characteristics of Equation (1), the calculated motion vectors gradually vary between starting points. Calculating the motion vectors of unidentified starting points by Equation (1) gives a smooth converted picture. These characteristics of Equation (1) are due to the setting of $w_n$ at the reciprocal of the square of $r_n$. Similar characteristics can also be obtained by setting $w_n$ at the reciprocal of $r_n$. However, setting $w_n$ at the reciprocal of the square of $r_n$ enables the picture to be converted more smoothly. This fact was discovered after trial and error.

Figure 9A:
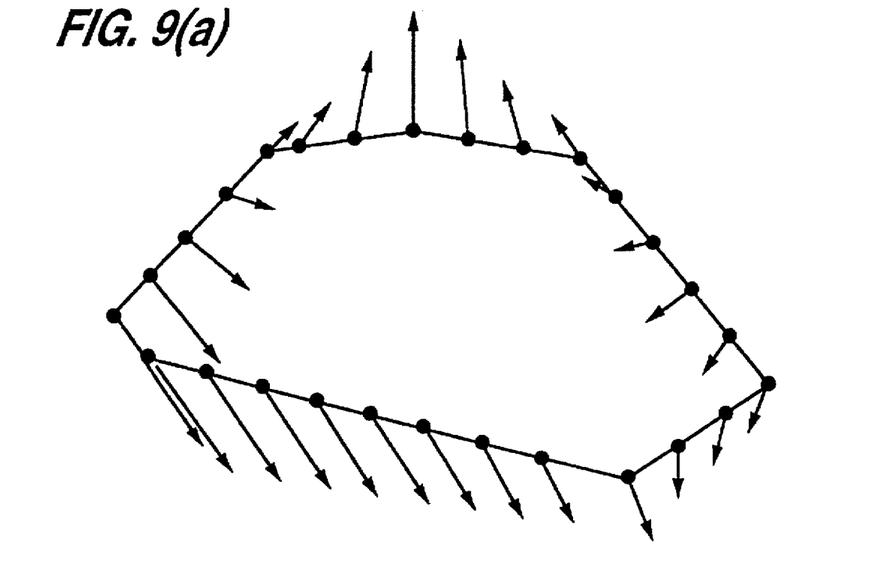
FIGS. 9(a) and 9(b) are still another diagram for describing the operation of the motion vector setting section 16.
Figure 9B:
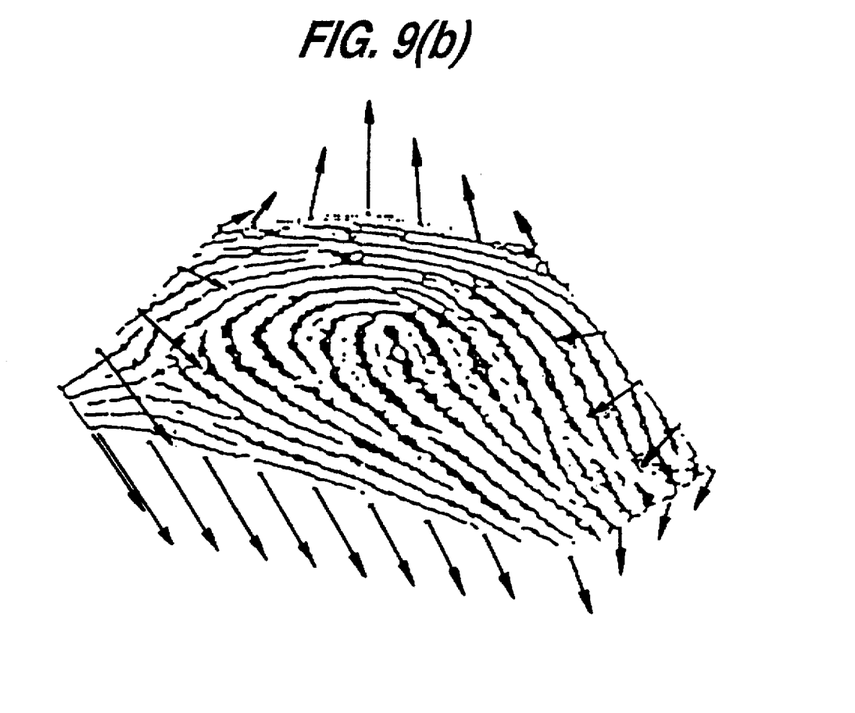

Referring to FIGS. 4 and 9 (a), at step 9, motion vectors calculated according to Equation (1) are displayed on the picture display section 11. On an actual display screen, as illustrated in FIG. 9 (b), the picture data 1, and the motion vectors overlap one another.

Referring now to FIG. 4, at step 10, the operator enters an input indicating whether or not motion vectors are to be set again. If unsatisfied with the result of motion vector calculation displayed at step 9, the operator instructs setting of motion vectors again. If resetting is instructed, the steps of processing from step 6 are executed again. If no resetting is required, step 11 is executed.

Referring to FIG. 4, at step 11, the picture data 1 are converted on the basis of the motion vectors.

Figure 10:
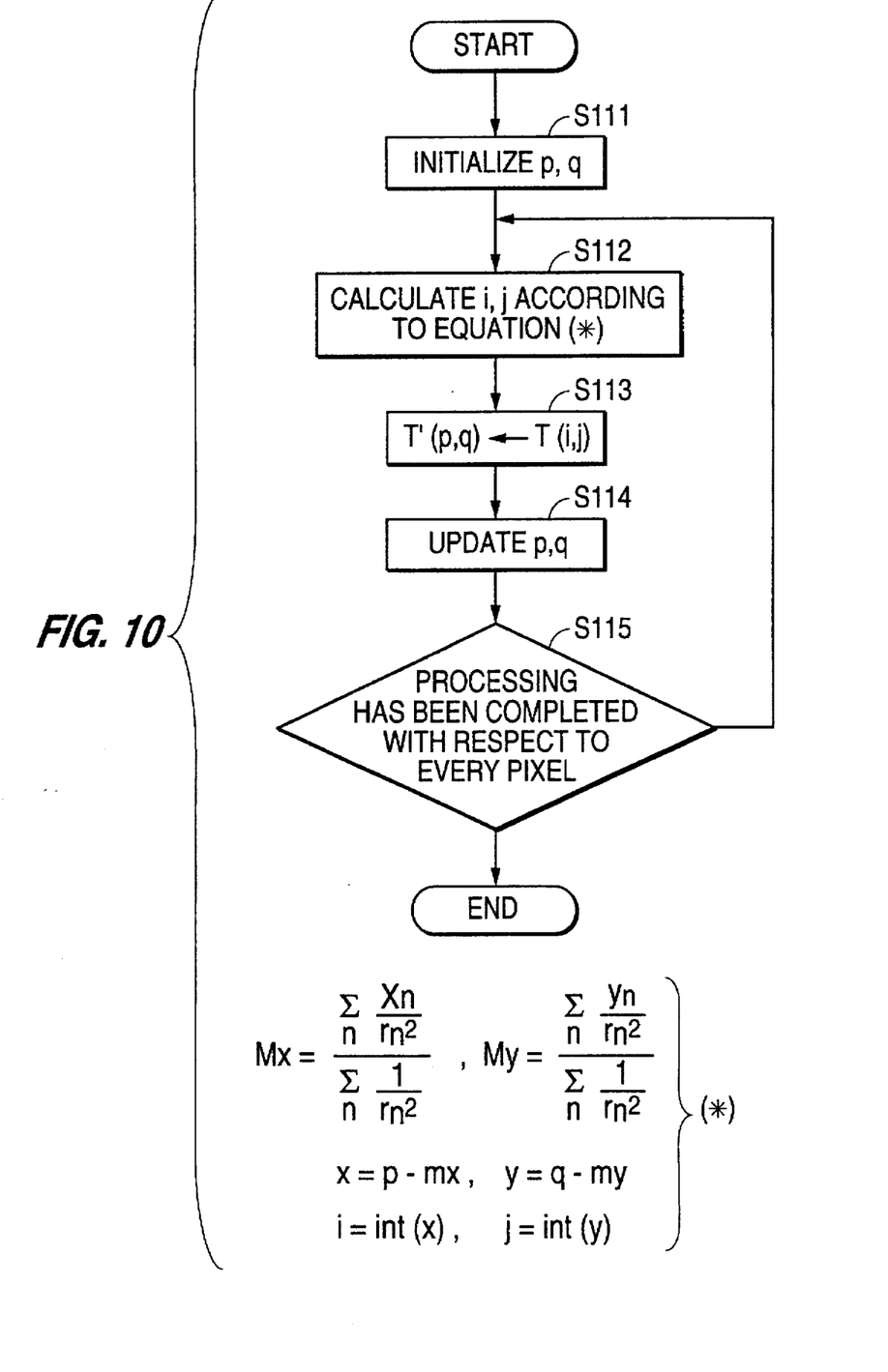
FIG. 10 is a flow chart showing the operation of the picture converting section 17.

Referring to FIG. 10, step 11 consists of five substeps 111 to 115.

Figure 12:
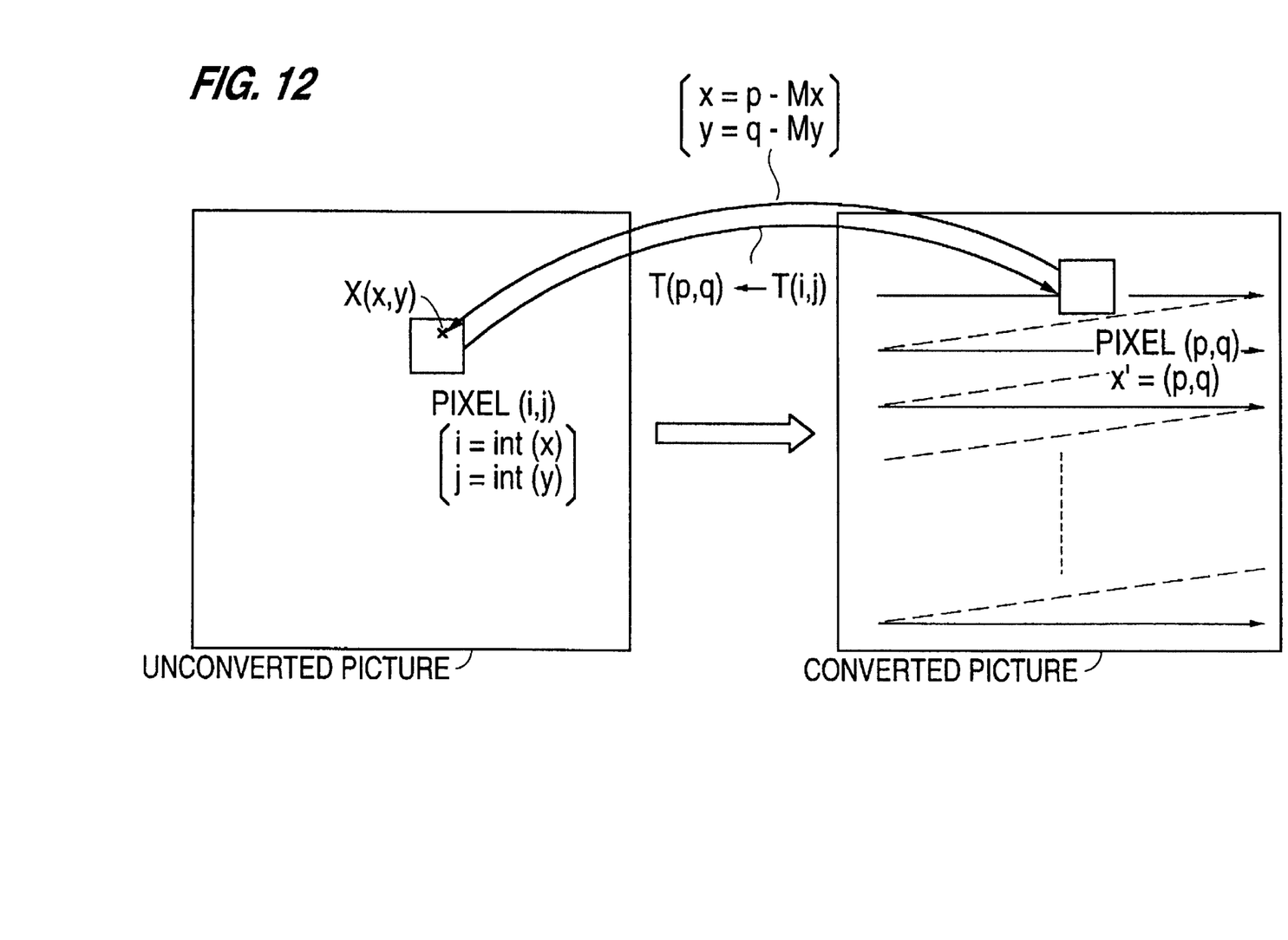
FIG. 12 is another diagram showing the operation of the picture converting section 17.

At substep 111, integers p and q are initially set. Referring to FIG. 12, p and q are coordinates of a pixel of the converted picture. The initially set values p and q are 0, for example.

Referring to FIGS. 10 and 12 together, at substep 112, correspondence between a pixel (p, q) of the converted picture and a pixel of the picture data 1 is identified. More specifically, point X (x, y), which represents the position of the pixel (p, q) before motion, is calculated according to Equations (3) below. Among the pixels of the picture data 1, a pixel (i, j) containing point X is what corresponds to the pixel (p, q).

$$\left. \begin{array}{l} m_x = \dfrac{\sum\limits_n \dfrac{x_n}{r_n^2}}{\sum\limits_n \dfrac{1}{r_n^2}} \\ \\ m_y = \dfrac{\sum\limits_n \dfrac{y_n}{r_n^2}}{\sum\limits_n \dfrac{1}{r_n^2}} \\ \\ x = p - m_x \\ y = q - m_y \end{array} \right\} \quad (3)$$

Figure 11:
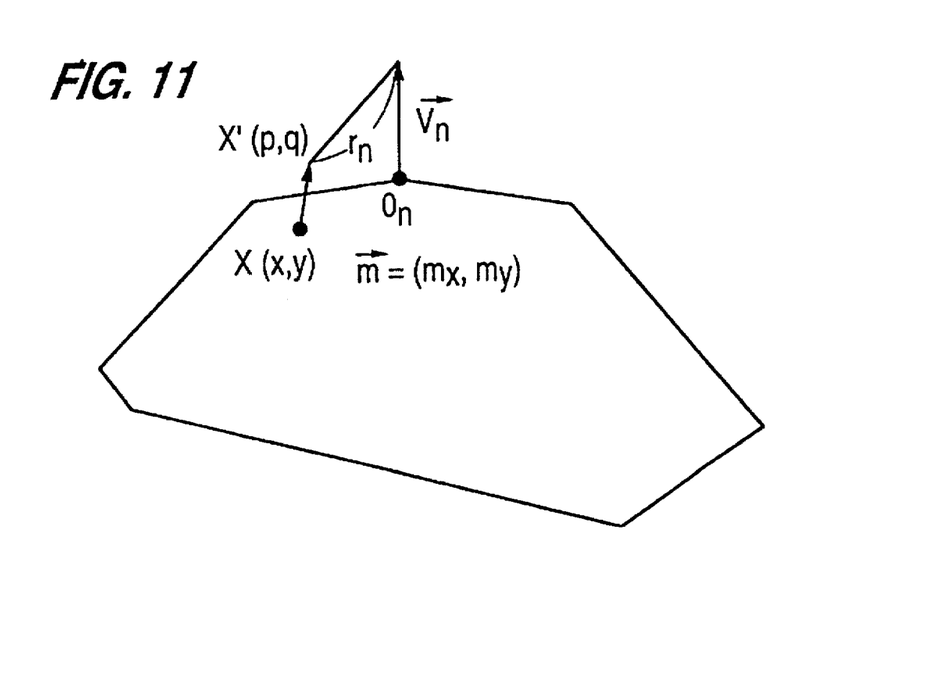
FIG. 11 is a diagram for describing the operation of the picture converting section 17.

Referring to FIG. 11, in Equations (3), vector $m=(m_x, m_y)$ is a vector having point X as the starting point and the pixel (p, q) as the end point. In Equations (3), both $m_x$ and $m_y$ can be obtained by weighted averaging; element $a_n$ is $x_n$ and $y_n$; weight $w_n$ is the reciprocal of the square of $r_n$; $x_n$ and $Y_n$ are the x-directional component and the y-directional component, respectively, of the n-th motion vector; and $r_n$ is the distance between the end point of the motion vector $V_n$ and coordinates (p, q), provided that vector m is equal to $V_n$ if $r_n$=0. Thus, the starting point of the motion vector $V_n$ is moved by this conversion to the end point of the motion vector $V_n$. This characteristic enables the operator to anticipate the converted picture to some extent.

Vector elements $m_x$ and $m_y$ are functions of p, q and the motion vector $V_n$, and therefore can be readily calculated. If the distance between the starting point $O_n$ of the motion vector $V_n$ and point X is set to be $r_n$, the calculation of Equations (3) will be complicated and take a long time. A longer processing time would impede the repetition of picture conversion and the setting of motion vectors.

The coordinates (i, j) of a pixel containing point X can be calculated by the following Equation (4), where the function int(x) returns the value resulting from the rounding of X.

$$\left. \begin{array}{l} i = int(x) \\ j = int(y) \end{array} \right\} \quad (4)$$

Referring now to FIGS. 10 and 12, at substep 113, the relative darkness T (i, j) of the pixel (i, j) is set for the relative darkness T' (p, q) of the pixel (p, q). If more precise picture conversion is required, T' (p, q) can as well be obtained by interpolation. More specifically, by selecting a plurality of pixels in the vicinity of point X and interpolating the relative darkness T of these pixels, the relative darkness T' (p, q) of the pixel (p, q) can be obtained. In this interpolation, the distance between point X and each pixel is taken into account.

Referring to FIG. 10, at substep 114, the values of p and q are updated. For instance, as shown in FIG. 12, p and q are successively updated so that the pixel (p, q) rasterscans the converted picture.

At substep 115, with respect to every pixel of the converted picture, it is judged whether or not processing has been completed. If there is any unprocessed pixel, the steps of processing from substep 112 on are executed again. When every pixel has been processed, step 12 of FIG. 4 is executed.

Next will be explained the meaning of picture conversion according to Equations (3) in more detail. Referring to FIG. 11, picture conversion according to Equations (3) means that point X in the unconverted picture has been moved to the pixel (p, q). Vector m between point X and the pixel (p, q) is close to motion vectors $V_n$ in the vicinity of the pixel (p, q). Therefore, in the vicinity of an outward motion vector $V_n$ of the picture data 1, the picture is extended. In the vicinity of an inward motion vector $V_n$ of the picture data 1, the picture is compressed.

These characteristics of picture conversion are due to the setting of weight $w_n$ of the motion vector $V_n$ at the reciprocal of the square of $r_n$. Similar characteristics can also be obtained by setting $w_n$ at the reciprocal of $r_n$. However, setting $w_n$ at the reciprocal of the square of $r_n$ enables the picture to be converted more smoothly. This fact was discovered after trial and error.

Figure 13A:
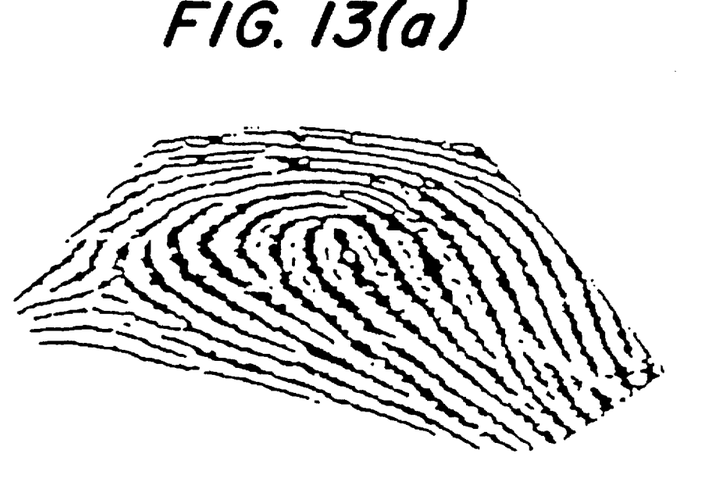
FIGS. 13(a) and 13(b) are diagrams, illustrating a picture converted by the picture converting section 17.
Figure 13B:
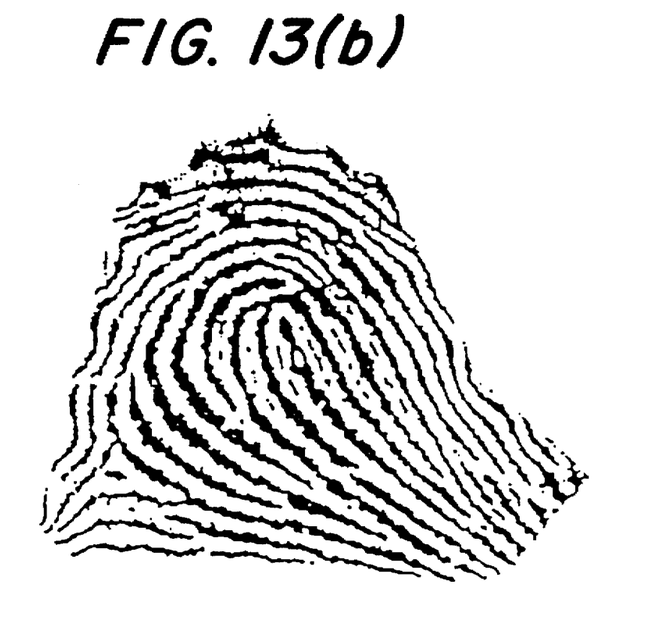

Referring to FIGS. 4 and 13 together, at step 12, the picture converted at step 11 is displayed. What has resulted from the conversion of the picture data 1 illustrated in FIG. 13 (a) according to the motion vectors shown in FIG. 9 (b) is given in FIG. 13 (b).

Referring to FIG. 4, at step 13, the operator gives an instruction as to whether or not reconversion of the picture is required. If unsatisfied with the picture displayed at step 12, the operator will request reconversion of the picture. If reconversion is requested, the steps of processing from step 5 are executed again. Repetition of the designation of motion vectors and the checking of the converted picture brings the converted picture gradually closer to what is desired. If no reconversion is required, step 14 is executed.

At step 14, the picture output section 18 supplies the picture converted by the picture converting section 17 to an external apparatus.

Next will be described a variation of the above-described embodiment of the invention. Although the motion vector for any unidentified starting point is calculated at step 8 in the foregoing embodiment, this step can be dispensed with. If it is, only the motion vectors designated at step 6 are referred to in the picture conversion at step 11. This variation, though serving to simplify the processing, will not give a smooth converted picture if the number of designated motion vectors is small. In the above-described embodiment, the contour of the area in which picture conversion should be carried out can as well be extracted automatically. Though the present invention is applied to an automatic fingerprint matching apparatus in the above-described embodiment, the applicable fields of the invention are not limited to fingerprint recognition.

As hitherto described, according to the invention, a distorted picture is converted in accordance with motion vectors indicating the directions in which the picture is deformed, and therefore a distorted picture, such as a fingerprint left on a curved face, can be corrected.

The motion vectors, since they are designated by the operator, can be adjusted until the desired picture is achieved. Furthermore, as motion vectors for unidentified starting points are automatically calculated, a smooth converted picture can be obtained even if only a small number of motion vectors are designated. At the same time, the number of input steps to be taken by the operator is reduced. When applied to an automatic fingerprint matching apparatus, the invention can improve the success ratio of fingerprint recognition.

As the present invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds, are therefore intended to be embraced by the claims.

What is claimed is:

1. An image analysis process executed by a computer connected to a display to display a picture and an input unit to enter data, said image analysis process receiving a first set of picture data representing an uncorrected picture, said image analysis process supplying a second set of picture data representing a corrected picture, each of said first and second sets of picture data comprising a plurality of pixels and each pixel of said first and second sets of picture data holding at least one kind of data, said process comprising:

a first step to receive said first set of picture data;

a second step to display on said display said uncorrected picture in accordance with said first set of picture data;

a third step to determine motion vectors for said uncorrected picture on the basis of information from said input unit;

a fourth step to generate a vector relating a pixel in said first set of picture data to a corresponding pixel in said second set of picture data using a weighted vector sum of motion vectors;

a fifth step to designate data in each pixel of said second set of picture data on the basis of data held by a corresponding pixel of said first set of picture data; and a sixth step to output said second set of picture data, and wherein the weight of said motion vectors is proportional to the reciprocal of the square of r, r representing a distance between a pixel of said second set of picture data and an end point of each of said motion vectors.

2. An image analyzer for use with a display to display a picture and an input unit to enter data, said analyzer receiving a first set of picture data representing an uncorrected picture, said analyzer supplying a second set of picture data representing a corrected picture, each of said first and second sets of picture data comprising a plurality of pixels and each pixel of said first and second sets of picture data holding at least one kind of data, said analyzer comprising:

a picture input unit to receive said first set of picture data;

a motion vector designating unit to display on said display said uncorrected picture in accordance with said first set of picture data, and to determine motion vectors for said uncorrected picture on the basis of information from said input unit;

a picture converting unit to generate a vector relating a pixel in said first set of picture data to a corresponding pixel in said second set of picture data using a weighted vector sum of motion vectors, and to designate data in each pixel of said second set of picture data on the basis of data held by a corresponding pixel of said first set of picture data; and a picture output unit to output said second set of picture data; and wherein the weight of said motion vectors is proportional to the reciprocal of the square of r, r representing a distance between a pixel of said second set of picture data and an end point of each of said motion vectors.

3. An image analyzer for use with a display to display a picture and an input unit to enter data, said analyzer receiving a first set of picture data representing an uncorrected picture, said analyzer supplying a second set of picture data representing a corrected picture, each of said first and second sets of picture data comprising a plurality of pixels and each pixel of said first and second sets of picture data holding at least one kind of data, said analyzer comprising:

a picture input unit to receive said first set of picture data;

a motion vector designating unit to display on said display said uncorrected picture in accordance with said first set of picture data and to input motion vectors which have been specified by instruction from the input unit for a plurality of starting points in said uncorrected picture and, when no motion vector has been specified by instruction from the input unit for a particular starting point, to generate a motion vector for said particular starting point using a weighted vector sum of at least two motion vectors which have been specified by instruction from the input unit;

a picture converting unit to identify a pixel in said first set of picture data corresponding to a pixel in said second set of picture data on the basis of said motion vectors, and to designate data in each pixel of said second set of picture data on the basis of data held by a corresponding pixel of said first set of picture data; and a picture output unit to output said second set of picture data, wherein a weight of each motion vector to be subjected to weighting is determined on the basis of a distance between a starting point of this motion vector and said particular starting point, and wherein a weight of each of said motion vectors is the reciprocal of the square of r, r representing the distance between the starting point of said motion vector and said particular starting point.

4. An image analysis process executed by a computer connected to a display to display a picture and an input unit to enter data, said image analysis process receiving a first set of picture data representing an uncorrected picture, said image analysis process supplying a second set of picture data representing a corrected picture, each of said first and second sets of picture data comprising a plurality of pixels and each pixel of said first and second sets of picture data holding at least one kind of data, said process comprising:

a first step to receive said first set of picture data;

a second step to display on said display said uncorrected picture in accordance with said first set of picture data;

a third step to input motion vectors which have been specified by instruction from the input unit for a plurality of starting points in said uncorrected picture and, when no motion vector has been specified by instruction from the input unit for a particular starting point, to generate a motion vector for said particular starting point using a weighted vector sum of at least two motion vectors which have been specified by instruction from the input unit;

a fourth step to identify a pixel in said first set of picture data corresponding to a pixel in said second set of picture data on the basis of said motion vectors;

a fifth step to designate data in each pixel of said second set of picture data, the data designated in each pixel being determined on the basis of data held by a corresponding pixel of said first set of picture data; and a sixth step to output said second set of picture data;

wherein a weight of each motion vector to be subjected to weighting is determined on the basis of a distance from a starting point of this motion vector and that of said particular starting point, wherein a weight of each of said motion vectors is the reciprocal of the square of r, r representing a distance between a starting point of said motion vector and that of said particular starting point.

5. A fingerprint analyzer for use with a display to display a picture, an input unit to enter data, and a memory to store reference fingerprint patterns, said analyzer receiving a first set of picture data representing an uncorrected picture of a latent fingerprint, said analyzer supplying a second set of picture data representing a corrected picture of the latent fingerprint, each of said first and second sets of picture data comprising a plurality of pixels and each pixel of said first and second sets of picture data holding at least one kind of data, said analyzer comprising:

a picture input unit to receive said first set of picture data representing an uncorrected picture of a latent fingerprint;

a motion vector designating unit to display, on said display, said uncorrected picture of the latent fingerprint in accordance with said first set of picture data, and to determine motion vectors for said uncorrected picture on the basis of information from said input unit;

a picture converting unit to identify a pixel in said second set of picture data representing a corrected picture of the latent fingerprint on the basis of said motion vectors, and to designate data in each pixel of said second set of picture data, the data to be designated in each pixel being determined on the basis of data held by the corresponding pixel of said first set of picture data; and a picture matching unit to match said second set of picture data representing the corrected picture of the latent fingerprint with a reference fingerprint pattern stored in said memory, wherein said picture converting unit converts said first picture into said second picture using a vector between a pixel in said second set of picture data and a corresponding pixel in said first set of picture data obtained by a weighted vector sum of motion vectors, and wherein the weight of each of said motion vectors is proportional to the reciprocal of the square of r, r representing the distance between the pixel of said second set of picture data and the end point of each of said motion vectors.

6. A fingerprint analyzer for use with a display to display a picture, an input unit to enter data, and a memory to store reference fingerprint patterns, said analyzer receiving a first set of picture data representing an uncorrected picture of a latent fingerprint, said analyzer supplying a second set of picture data representing a corrected picture of the latent fingerprint, each of said first and second sets of picture data comprising a plurality of pixels and each pixel of said first and second sets of picture data holding at least one kind of data, said analyzer comprising:

a picture input unit to receive said first set of picture data representing an uncorrected picture of a latent fingerprint;

a motion vector designating unit to display, on said display, said uncorrected picture of the latent fingerprint in accordance with said first set of picture data, and to determine motion vectors for said uncorrected picture on the basis of information from said input unit;

a picture converting unit to identify a pixel in said second set of picture data representing a corrected picture of the latent fingerprint on the basis of said motion vectors, and to designate data in each pixel of said second set of picture data, the data to be designated in each pixel being determined on the basis of data held by the corresponding pixel of said first set of picture data; and a picture matching unit to match said second set of picture data representing the corrected picture of the latent fingerprint with a reference fingerprint pattern stored in said memory, wherein the motion vector designating unit sets a plurality of starting points in said uncorrected picture, and determines motion vectors each corresponding to one of said plurality of starting points, wherein said motion vector designating unit, if said plurality of starting points include an unidentified starting point for which no motion vector has been determined, calculates the motion vector for said unidentified starting point on the basis of determined motion vectors, wherein said motion vector designating unit obtains the motion vector for said unidentified starting point by weight averaging of the determined motion vectors, and the weight of each motion vector to be subjected to weighted averaging is determined on the basis of the distance from the starting point of this motion vector and that of said unidentified starting point, and wherein the weight of each of said motion vectors is the reciprocal of the square of r, r representing the distance between the starting point of said motion vector and that of said unidentified starting point.

7. A fingerprint matching process executed by a computer connected to a display to display a picture, an input unit to enter data, and a memory to store reference fingerprint patterns, said process receiving a first set of picture data representing an uncorrected picture of a latent fingerprint, said process supplying a second set of picture data representing a corrected picture of the latent fingerprint, each of said first and second sets of picture data comprising a plurality of pixels and each pixel of said first and second sets of picture data holding at least one kind of data, said process comprising:

a first step to receive said first set of picture data;

a second step to display on said display said uncorrected picture of a latent fingerprint in accordance with said first set of picture data;

a third step to determine motion vectors for said uncorrected picture of the latent fingerprint on the basis of information from said input unit;

a fourth step to identify a pixel in said first set of picture data corresponding to a pixel in said second set of picture data on the basis of said motion vectors;

a fifth step to designate data in each pixel of said second set of picture data, the data to be designated in each pixel being determined on the basis of data held by the corresponding pixel of said first set of picture data; and a sixth step to match said second set of picture data representing a corrected picture of the latent fingerprint with a reference fingerprint pattern stored in said memory, wherein a vector between a pixel in said second set of picture data and a corresponding pixel in said first set of picture data is obtained at said fourth step by a weighted vector sum of motion vectors, and wherein the weight of each of said motion vectors is proportional to the reciprocal of the square of r, r representing the distance between the pixel of said second set of picture data and the end point of each of said motion vectors.

8. A fingerprint matching process executed by a computer connected to a display to display a picture, an input unit to enter data, and a memory to store reference fingerprint patterns, said process receiving a first set of picture data representing an uncorrected picture of a latent fingerprint, said process supplying a second set of picture data representing a corrected picture of the latent fingerprint, each of said first and second sets of picture data comprising plurality of pixels and each pixel of said first and second sets of picture data holding at least one kind of data said process comprising:

- a first step to receive said first set of picture data;
- a second step to display on said display said uncorrected picture of a latent fingerprint in accordance with said first set of picture data;
- a third step to determine motion vectors for said uncorrected picture of the latent fingerprint on the basis of information from said input unit;
- a fourth step to identify a pixel in said first set of picture data corresponding to a pixel in said second set of picture data on the basis of said motion vectors;
- a fifth step to designate data in each pixel of said second set of picture data, the data to be designated in each pixel being determined on the basis of data held by the corresponding pixel of said first set of picture data; and
- a sixth step to match said second set of picture data representing a corrected picture of the latent fingerprint with a reference fingerprint pattern stored in said memory, wherein said third step includes
- a step to set a plurality of starting points in said uncorrected picture, and
- a step to determine motion vectors, each motion vector corresponding to one of said plurality of starting points, on the basis of instruction from said input unit, wherein, if said plurality of starting points include any unidentified starting point for which no motion vector has been determined, the motion vector for said unidentified starting point is calculated on the basis of determined motion vectors, wherein
the motion vector for said unidentified starting point is obtained by weighted averaging of the determined motion vectors,
the weight of each motion vector to be subjected to weighted averaging is determined on the basis of the distance from the starting point of this motion vector and that of said unidentified starting point, and wherein the weight of each of said motion vectors is the reciprocal of the square of r, r representing the distance between the starting point of said motion vector and that of said unidentified starting point.

* * * * *